Patented Oct. 13, 1953

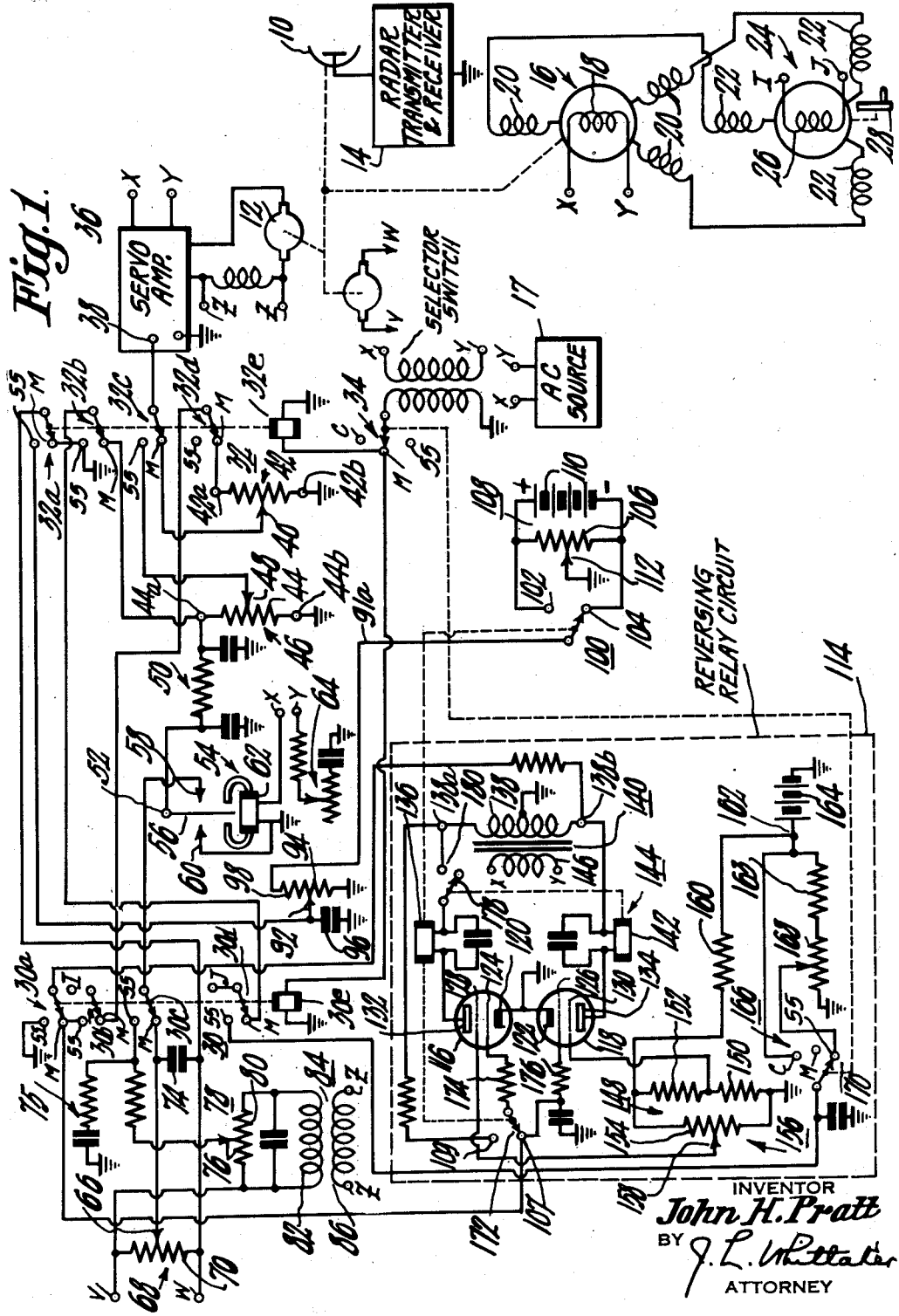

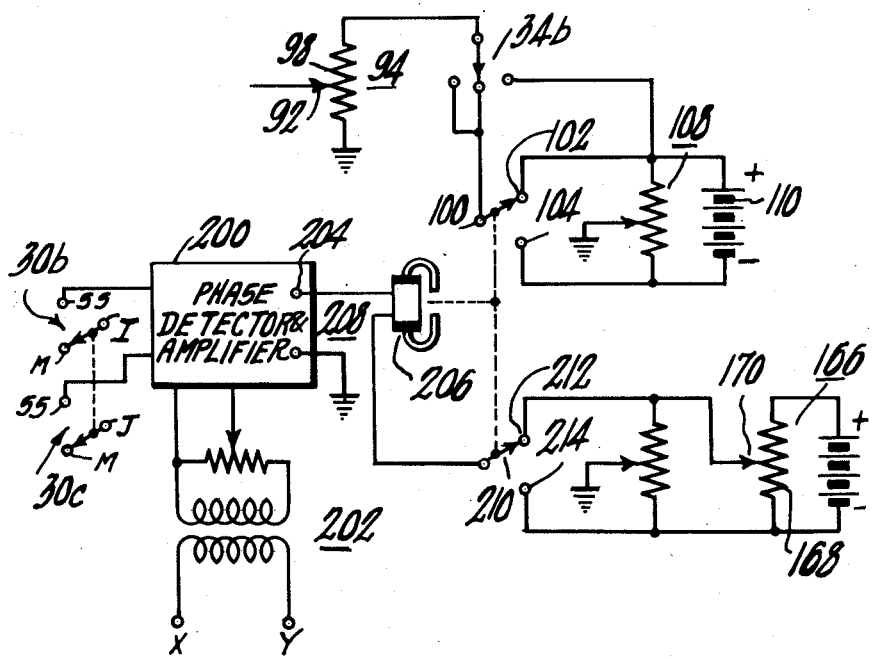

2,655,628

UNITED STATES PATENT OFFICE 2,655,628

SCAN APPARATUS

John H. Pratt, La Crescenta, Calif., assignor to Radio Corporation of America, a corporation of Delaware Application June 11, 1951, Serial No. 230,957

10 Claims. (Cl. 318—28)

The present invention is related to motor control apparatus and more particularly to positioning devices.

In radar (radio echo detection and ranging) systems, it is often desired to scan a particular sector of space with a beam of pulsed radio energy from an antenna. Reflections of the energy by distant objects may then supply an indication of position. The range measure is obtained by measuring the time for the pulse to travel to and return from the object under study. The angular position from the radar set may be obtained by knowledge of the direction in which the antenna is pointing at the time the pulse was transmitted and received. The angular measure may be restricted to one plane, as the azimuthal plane, or one angle of altitude, or both of these angular directions, azimuth and altitude may be desired and obtained.

It is often desirable, in radar systems, to scan predetermined sectors at constant speed, independent of wind and other forces. However, it is not usual to be able to select the angular width of the scanned sector to be any desired angle within specified limits of a range of sector sizes simply, and if desired, from a remote position. Such selection if desired has heretofore required additional equipment often prohibitive by reason of expense, bulk of additional components required, and other design difficulties. It is further desirable to select the center line or mid-line of the sector to be scanned. This has heretofore been accomplished for predetermined sectors. However, there has been no simple or convenient means heretofore known by which the central direction of the sector scan may be selected at will over a large sector and also by which the size or angle of the sector may be selected at will over a range of sector sizes.

It is also often desirable, in radar systems, to rotate the antenna continuously at constant speed; the speed to be independent of wind loading, variable frictional forces and other forces which might tend to vary the speed. This has not heretofore been done by simple or convenient means when the function of the antenna control equipment included controlling the position of the antenna.

Although the invention is herein described in connection with radar scanning, it will be apparent that it has other applications where it may be desired to oscillate equipment back and forth over a range selectable at will within limits, or to continuously move said equipment, and also to select at will the median point or position of the oscillations.

It is an object of the invention to improve radar scanning control, and more generally, the control of motors.

Another object of the invention is to provide scan apparatus, whether for radar or for other purposes, of greater flexibility in use and subject to greater control than those heretofore available.

Still another object of the invention is to provide scan apparatus in which the sector to be scanned may be selected at will within limits and the median or center of the sector may also be selected at will.

A still further object of the invention is to provide means to scan in the manner just described in a comparatively compact and simple apparatus.

Still another object of the invention is to provide improved apparatus for continuously rotating or moving an object at a constant, closely-controlled speed independent of varying forces tending to speed-up or slow-down the rotational velocity, while the apparatus may also be used to position the object.

Another object of the invention is to provide an improved apparatus by which an object may be positioned at will, or alternatively caused to scan, and by which the scan sector, both in amplitude and direction, may be selected at will.

According to one important feature of the invention, the same servo system is operated as a position servo or a speed servo, by applying the position voltage as the error signal of the servo system, or by applying a speed error voltage. In this fashion, there need be very few components added to an ordinary radar system, which usually has a positioning servo-system, to make available the advantageous features of the invention. Preferably the speed voltage from which the speed error voltage is derived, is employed to modify the position control voltage when the system is operated as a position servo system, to provide a properly damped position control servo system.

According to another important feature of the invention, the scan motion is imparted to an object herein exemplified by a radar antenna, by a servo system operating as a speed servo, the error signal for which is the difference between the speed (or velocity) voltage and a speed control voltage. Thus, the speed with which the scan motion occurs is readily and advantageously controlled. The motion is reversed when the position of the object to which the scan motion is to be imparted provides a position voltage sufficient to operate a relay or reversing switch by overcoming a reversal control voltage. Thus by selection of the reversal control voltage, the width or amplitude of the sector may be selected at any desired value. The position signal may be altered to have a null stable position control value at any desired selected point, which determines the center or direction of the scanned sector. By elimination of the control of the reversing relay by the position voltage the radar antenna may be made to rotate continuously in one direction.

The foregoing objects, advantages, and novel features of the invention will be more apparent from the following description when taken in connection with the accompanying drawing, in which like parts have like reference numerals and in which:

Fig. 1 is a diagram schematically illustrating one embodiment of the present invention employing a gas tube reversing circuit; and Fig. 2 is a diagram schematically illustrating a circuit which may be optionally substituted for the gas tube reversing circuit of Fig. 1.

Referring to Fig. 1 an apparatus to be positioned and oscillated or scanned at will is the radar antenna 10 driven by a motor 12. A radar transmitter and receiver 14 is connected electrically in known manner to supply information of the range of energy reflecting objects by measuring the time for the signal to travel from the antenna 10 to the objects and return. Information of the angle of the reflecting object may be indicated by the radar by correlating the angular position of the antenna 10 with the indicator, also in known manner.

The rotor 18 of a synchro-transformer 16 is mechanically connected to take a position determined by the angular position of antenna 10. The rotor 18 is electrically connected to a source of A. C. power 17, the terminals of which are schematically indicated as XY. To simplify the description, it may be assumed that the antenna 10 is driven in azimuth only by the motor 12.

The stator windings 20 of the synchro-transformer 16 are connected to the stator windings 22 of a second synchro transformer 24. The control rotor 26 of the second synchro transformer 24 is connected mechanically to a hand wheel 28. The control rotor 26 is electrically connected to terminals IJ across which appears a position control voltage which has an amplitude proportional to the displacement of the first rotor 18 (and antenna 10) from an angular position of correspondence with the position of second rotor 26 controlled manually by the hand wheel. The position control voltage across terminals IJ also is in or out of phase with the voltage across terminals XY depending on the sense of the lack of positional correspondence of the first rotor 18 with that of the second rotor 26.

A relay 30 has four sets of single pole double throw contacts 30a, 30b, 30c, and 30d, and a second relay 32 has four sets of single pole double throw contacts 32a, 32b, 32c, and 32d. A double-pole selector switch 34 with sections 34a and 34b has three positions. In the position marked M power is applied from the source 17 to the windings 30e and 32e respectively of relays 30 and 32 through section 34a. When the selector switch 34 is in the position marked M, the relays 30 and 32 are actuated to close the contacts 30a to 30d and 32a to 32d to the position designated M. When selector 34 is in the positions designated SS or C, the relays 30 and 32 are restored to their normal position to close the contacts 30a to 30d and 32a to 32d to the position designated SS. The function of section 34b of switch 34 is to make circuit connections required to cause the operation of the antenna in continuous rotation and is described more fully hereinafter. The position of the relays to close the contacts designated M is selected for operation with manual control. In this M position of selector switch 34, the antenna 10 is to respond to the position of the handwheel 28 to seek positional correspondence therewith, but without scanning. In the SS position, the handwheel 26 controls the position of the center of a sector of desired width. The manner of operation is explained more fully hereinafter. A servo amplifier 36 is connected to apply power to motor 12 in a phase corresponding to the in-or-out-of-phase signals voltage received at its input terminal 38 and with an amplitude corresponding to the amplitude of the input signal.

The remainder of the circuit will first be described with selector switch 34 in the M position and then described with switch 34 in the SS position. Finally, the circuit will be described with switch 34 in the C position.

With switch 34 in the M position, the servo amplifier input terminal 38 receives an error signal through contacts 32c in the M position from the tap 49 of a potentiometer 42. A position control voltage is applied to one terminal 42a of the resistor of potentiometer 42 through contacts 32d and contacts 30b from terminal I. The other terminal 42b of the resistor of potentiometer 42 is connected to a common ground conductor indicated by the conventional symbol. Terminal I (shown adjacent contacts 30b) is the same as the terminal I shown at the second synchro transformer 24, the terminal being thus shown at two points on the schematic to avoid the necessity of drawing a long possibly confusing connecting conductor. Terminal I is one terminal of the control rotor 26. The other terminal J of the control rotor 26 (shown at synchro transformer 24 and also at contacts 30d) is connected with relays 30 and 32 in M position, through contacts 30d and contacts 32b to one terminal 44a of a resistor 44 of potentiometer 46, the other terminal 44b of which is grounded. The arm 48 of potentiometer 46 in this position of the switches is connected to an open contact of the set of contacts 32c. The terminal 44a of resistor 44 is a junction connected to one terminal of a resistor capacitor filter network 50. The other terminal of filter network 50 is connected to the arm terminal 52 of a vibrator 54 employed as a chopper or modulator.

The arm 56 of chopper 54 makes contact alternately to contacts 58 and 60, the latter contact being grounded. The arm 56 is actuated synchronously with the alternations of source 17 by a polarized relay winding 62 connected to source 17. A resistor capacitor network 64 allows adjustment of the voltage applied to winding 62 to the proper value to operate the contacts of chopper 54 in phase with the source voltage. The ungrounded contact 58 of chopper 54 is connected through contacts 30c in the M position to potentiometer arm 66 of potentiometer 68. A tachometer 72 has its terminals VW (shown adjacent to potentiometer 68 and also at tachometer 72 near antenna 10) connected across the potentiometer resistor 70. The tachometer 72 may be a direct current generator mechanically connected to antenna 10 to have an output voltage proportional, in amplitude and polarity, to the angular speed or velocity of the antenna 10. In the M position of the switch, the terminal W is grounded through contacts 32a. Capacitor 74 filters high frequency components from the velocity feedback voltage picked up by potentiometer arm 66.

The operation, with the control switch 34 in the M position, is that of an ordinary servo-mechanism radar system. The handwheel 24, which may be calibrated if desired, is set to point the antenna 10 in any desired direction. If there is a discrepancy in the handwheel position and that of antenna 10, there is also a discrepancy in the positions of the rotors 18, 26 which causes a position control voltage to appear at control rotor 26 terminals IJ. The position control voltage at terminals I and J is applied by switch contacts 30b, 32d, and switch contacts 30d and 32b respectively between the terminals 42a and 44a of potentiometers 42 and 46 respectively. The voltage between terminals 42a and 42b has a reference to ground by virtue of the ground connections of terminals 42b and 44b. A portion of the voltage as referred to ground is taken off by the potentiometer arm 40 and applied through contacts 32c as the error voltage to input terminal 38 of the servo amplifier 36. The servo amplifier 36 then applies power from the source 17 in a phase and amplitude proportional to the position displacement control signal to drive the antenna in a direction to reduce the error signal by driving rotor 18 into positional correspondence with rotor 26.

However, the error signal is modified by a velocity feedback signal derived from tachometer 72. A portion of the tachometer direct current voltage is picked up by arm 66 of potentiometer 68, passes through contacts 30c to chopper 54, where it is converted with the aid of filter 50 to a sinusoidal voltage having an amplitude dependent on the angular velocity of antenna 10 (proportional to the driven speed of tachometer 72) and in or out of phase with the voltage from A. C. source 17 depending on the direction in which antenna 10 is being driven (which determines the polarity of the D. C. output at terminals VW). The converted sinusoidal velocity voltage is added or subtracted from the error signal applied to input terminal 38, and serves thereby as a rate or anticipatory voltage improving the performance of the servo-system. As well understood, the error voltage connections and that of the velocity feedback connections must be made to secure the proper phasing. Under conditions in which the antenna 10 is driving toward the desired position of correspondence, the error voltage unmodified by the velocity feedback voltage should be in that phase to cause antenna 10 to drive toward the desired position although decreasing in amplitude. The velocity feedback voltage should be in the opposite phase, under these conditions.

With selector switch 34 in the SS position, the relays 30 and 32 have their various contacts 30a to 30d and 32a to 32d in the positions designated SS. Terminal 38 is then connected through contacts 32e to the potentiometer arm 48. Contact 44a is open circuited at contacts 32b but remains connected through filter 50 to the chopper terminal 52. Chopper contact 60 remains grounded but chopper contact 59 is connected by contacts 30c through a resistor capacitor filter network 75 to the potentiometer arm 76 of a potentiometer 78. The tachometer potentiometer arm 66 is left disconnected by contacts 30c in the SS position. The potentiometer resistor 80 is connected across the secondary 82 of a transformer 84. The primary 86 of transformer is connected by terminals ZZ (shown also near motor 12) across the commutating field winding 88 of motor 12. The commutating field winding is connected in series with the armature of motor 12 in the usual manner. A filter capacitor 90 is inserted across secondary 84 to minimize passage of commutator sparking and other high-frequency voltages.

One terminal of the secondary 82 is connected to the tachometer terminal V. The other tachometer terminal XW is connected by contacts 32a to arm 92 of a speed control potentiometer 94. The speed control potentiometer resistor 98 has one terminal grounded and the other terminal connected to receive voltage from reversing relay contact arm 100. Capacitor 96 is connected between speed control potentiometer arm 92 and ground. The arm 100 under sector scan control is to be switched alternately from one to the other of contacts 102 and contact 104 in a manner to be described. The reversing relay contacts 102 and 104 are connected across the resistor 106 of a potentiometer 108. A direct current voltage supply 110 indicated schematically by a conventional battery symbol is also connected across reversing relay potentiometer resistor 106. The arm 112 of the reversing voltage potentiometer 108 is grounded, so that the voltages at contacts 102 and 104 may be adjusted to be equal in value but opposite in polarity with respect to the ground conductor. Such adjustment is ordinarily desired, as will appear hereinafter.

The reversing relay contact arm 100 is actuated by relay 136, which is part of a circuit designated as the reversing relay circuit 114. This circuit includes first and second gas tubes 116 and 118, each of which may be of the type 2D21 thyratrons. Tubes 116, 118 have, respectively, cathodes 120, 122, control grids 124, 126, screen grids 128, 130, and anodes 132, 134. The first gas tube anode 132, is connected through the winding of relay 136 to one terminal 138a of the secondary 138, center tap grounded, of a power transformer 140. The second gas tube anode 134 is connected through the winding 142 of a relay 144 to the other terminal 138b of the power transformer secondary 138. The primary 146 of the power transformer 140 receives voltage from the source 17. The gas tube cathodes are grounded. The gas tube screen grids 128 and 130 are connected to a potentiometer resistor network 148, with the second tube screen grid 130 connected to a junction between one terminal of each of two equal resistors 150 and 152. A potentiometer resistor 154 of a potentiometer 155 equal in value to the sum of the values of the series connected resistors 150, 152 is shunted across their other terminals. The arm 156 of the shunted potentiometer 155 is connected to the first tube screen grid 128. One terminal of a resistor 160 is connected to the junction of the network potentiometer resistor 154. The other terminal of resistor 160 is connected at a junction point 162 to the negative terminal of a direct current voltage source 164, the positive terminal of which is grounded.

A sector width control potentiometer 166 has its resistor 168 connected between the junction 162 and ground, and has its arm 170 connected to apply voltage through contacts 30d in the SS position between terminal J of the position control synchro rotor 26 and ground. Relay 113 has two sets of contacts, those already described as the reversing relay contacts 102 and 104, and a second set of contacts 107 and 109. The second set of contacts are made by contact arm 172, normally connected to contact 107, and actuated by current through the winding of relay 136 to make contact 109 and break contact 107. The arm 172 is connected through a current-limiting resistor 174 to the first tube control grid 124. The contact 107 is connected through a current-limiting resistor 176 to the second tube control grid 126. Relay 142 in the second tube anode circuit has a contact arm 178 and a contact 180 connected in the first tube anode circuit between relay winding 136 and the power transformer primary terminal 138a. The arm 178 is normally closed to contact 180 to complete or make the first tube anode circuit when no current passes through the winding 142 of relay 144 and is opened to interrupt or break the first tube anode circuit when current passes through the winding 142. Power transformer terminal 138b is connected through a resistor 182 through contacts 30a in the SS position to ground, and in the M position to contact 107 of the relay 136.

In operation, when the selector switch 34 is in the SS position, the servo amplifier input terminal 38 receives voltage through contacts 32c in the SS position applied from potentiometer arm 48 by which the amplitude of the total error signal (or the gain of the system) may be adjusted for optimum operation. The junction 44a receives voltage from the chopper 54 through the filter 50. The chopper contact 58 receives its voltage through contacts 30c in the SS position from potentiometer arm 76 which picks off the potentiometer a voltatge derived from the field winding 88 of the drive motor 12. This voltage picked up by the arm 76, adjustable to optimum values, is, because of the connection of transformer 84, proportional to the rate of change of current through field winding 88; the secondary voltage being proportional to the rate of change of the primary current. Since the primary current is proportional to the current through (and voltage across) the field winding 88, the voltage picked up by the arm 78 is proportional to the rate of change of speed of the motor 12 and of the antenna 10.

The rate of change of speed voltage is serially connected with the tachometer voltage through terminals V and W, and through contacts 32a in the SS position with a direct current (D. C.) voltage picked up at arm 92 of the speed control potentiometer 94. The D. C. speed control voltage is positive or negative with respect to ground depending on which of relay contacts 102 and 104 is made at the time, but preferably is the same in magnitude whether positive or negative, due to adjustment of the speed balance control 112, to make the scanning speed in either direction across the sector the same.

The voltages thus applied to the input terminal of the servo amplifier (before chopping), include first, a voltage proportional to the rate of change of velocity of antenna 10, second a voltage proportional to the velocity of antenna 10, and third a D. C. velocity or speed control voltage, all serially connected and therefore each being respectively added or subtracted. The polarities of the connections are selected for the second voltage (the velocity or speed voltage) so that the motor drives at a velocity and in a direction to reduce this speed voltage. The speed control voltage added to this speed voltage causes the motor and antenna to drive at a speed and in a direction to equalize the two voltages, the direction of drive therefore being determined by the polarity of the speed control voltage, and tending to remain constant. The rate of change of speed voltage is added to stabilize and increase the speed constancy. Its polarity is selected so that, when the antenna drive speed is increasing toward a constant speed, the rate of change of speed voltage tends to decrase the speed of drive.

Turning attention to the reversing relay circuit: voltage from the position control rotor 26 is impressed by contacts 30b and 30d between the contact 106 and the SS width control potentiometer arm 170. This introduces an A. C. voltage in or out of phase with source 17 in series with the D. C. voltage from source 164, which is impressed on both of the control grids 124 and 126. The amplitude of this A. C. voltage depends on the positional correspondence between the antenna and the handwheel 28.

The cyclical operation caused by the reversing relay circuit may be examined starting from correspondence between the handwheel 28 and the antenna, when the amplitude of the A. C. voltages supplied to the tube control grids 124 and 126 are zero. With the selector switch 34 in the SS position both tubes are nonconductive, due to the bias from D. C. source 164 on the screen grids. The antenna is now driving in one direction. The connections are made in such a polarity that an increasing A. C. voltage derived from the position control rotor 26 is applied to the control grids 124 and 126 in phase with the voltage from terminal 138a of the power transformer. When the antenna has driven sufficiently far so that the A. C. voltage overcomes the bias, the first tube 116 is caused to conduct. Reversing relay 136 is actuated, causing contact 104 to break and contact 102 to make, thereby reversing the direction of drive.

The antenna now quickly reverses and drives at a constant speed determined by the speed control voltage in the opposite direction. Actuation of reversing relay 136 also causes contact 107 to break and contact 109 to make. From contact 109, the first tube control grid receives a voltage from power transformer terminal 138a in phase with its anode voltage (through a resistor) which keeps the first tube 116 conducting. The reversing relay thus remains actuated as the antenna drives toward and past the position of correspondence with the handwheel 28. As the antenna passes the position of correspondence with handwheel 28, the A. C. voltage from control rotor 26 applied to contact 107 and the second tube grid 126 reverses phase, after becoming zero in amplitude, and increases in amplitude and remains then in phase with the voltage at terminal 138b. When the antenna reaches a certain position, the voltage at the second tube control grid is sufficient to cause tube 118 to conduct, relay 144 is actuated to open the first tube anode circuit at contact 180. The reversing relay contacts return to their normal positions, with contact 104 made and contact 102 open; and contact 107 made and contact 109 open. The speed control voltage is reversed, causing the antenna 10 quickly to reverse direction and drive at constant speed toward the position of correspondence with handwheel 28. Shortly after this return drive begins, tube 118 ceases to conduct, and relay contact 180 is again made. But tube 116 is not fired again until the antenna drives past positional correspondence with handwheel 28 so that the voltage at the first tube control grid 128 again fires tube 116.

With the selector switch 34 in the SS position and the reversing relay circuit and speed balance properly adjusted, the antenna can be made to scan over a sector centered on the position of correspondence with the handwheel 28. The speed balance provides means for securing equal velocity scan in each direction. The width of this sector may be calibrated closely to the position of the SS width control potentiometer 170, which may be calibrated for desired sector scan widths.

With the SS width control arm at ground, the minimum scan sector is secured. This may be made practically zero sector, so that the reversing relay 136 "chatters" rapidly, its contacts 102 and 104 being made at short intervals. In this condition, when there is positional correspondence of the antenna 10 with handwheel 28, inertia of the system is sufficiently great so that the antenna 10 can actually be positioned by the handwheel 28 almost as well as when the selector switch is in M position, although positioning is not as smoothly accomplished and not as accurate, the system having some degree of "overshoot." At the other extreme, with the SS width control arm 170 arranged to pick up voltage near the junction of resistors 163 and 168 the sector width is nearly 180°. The voltage across potentiometer 168 is limited to a value less than that required to produce a scan width of 180°. If the voltage were greater than this the antenna would rotate continuously in one direction because the voltage from the control rotor 26 would always be insufficient to cause conduction of tubes 116 or 118 and relay arm 100 would remain in one position or the other. The capacitors connected across the relay windings 136 and 142 are to prevent chattering, because the tubes 116, 118 actually conduct only on half cycles of the power transformer voltage.

Position C of selector switch 34 is provided to produce continuous rotation when this is required. In this position maximum negative voltage is applied to the grids of tubes 116 and 118 and they remain cut off. Switch 34 might be turned to the C position from the SS position when tube 116 was locked on through contact 108 of relay 136. Thus, if other means were not provided, the antenna might rotate in either direction when switch 34 was placed in the C position. Because it may be desirable that the antenna always rotate in the same direction a circuit is provided to ensure this. In passing through the M position of switch 34 on the way to the C position resistor 182 is connected, through the M contact of relay contact 30a to contact and junction 106 and the grid of tube 118. This places a voltage on the grid 126 of tube 118 in phase with the plate voltage and the tube fires, operating relay 142 and opening contact 180 in the plate circuit of tube 116. If tube 116 is locked on, the locking circuit is broken by this action and the tube 116 ceases to fire since the voltage applied to its grid through contact 106 is out of phase with its plate voltage. As switch 34 is moved on to the C position a high negative D. C. voltage is applied to both tube grids from junction point 162 and both tubes are thereby cut off. Thus it is always assured that both tubes are cut off in the C position, contact 104 is always made, and the antenna always rotates in the same direction.

The details of the servo amplifier have not been illustrated. Various suitable amplifiers are known. The one actually employed applies power from a three phase source through gas tubes to the D. C. motor 12 and is a known circuit with only minor variations. The D. C. voltage supplies have been illustrated as batteries, although the usual rectifier power supplies are employed. These simplifications enable illustration of the invention without its obscuration by circuit details which are readily supplied by persons skilled in the art. Sufficient detail, however, has been shown to enable one skilled in the art readily to make a practical circuit, usable in the field.

Many variations of the invention are possible. For example, it is apparent that a D. C. servo amplifier could be employed by suitable variations of the circuitry. As a specific example of one variation, the reversing relay circuit 114 may be replaced by the circuit of Fig. 2. In Fig. 2, the contacts 30b and 30c of Fig. 1 are shown. The contacts 30a need not be employed. In the SS position of relay 30, voltage from the control rotor 26 is applied to a phase detector and amplifier 200. This voltage is compared with the phase of a voltage from a transformer 202 supplied with power from source 17. When the voltage from terminals I to J is in one phase, the output at terminal 204 of the detector and amplifier 200 is one polarity, and a reverse polarity when the voltage from terminals I to J is in the reverse polarity. The amplitude of the output voltage at terminal 204 is proportional to the amplitude of the voltage from terminals I to J. The output from terminal 204 is applied to the winding 206 of a polarized relay 208. The winding 206 is also serially connected through arm 210 to either one or the other of contacts 212 or 214 of reversible relay 208. The voltages at terminals 212, 214 are equal and of opposite polarity. The relay 208 also operates to connect terminal 100 with alternate ones of contacts 102 and 104 on each reversal, as illustrated.

The voltage at terminal 204 must overcome that at a contact 212 to cause the relay to operate in one direction; and that at 204 must overcome that at contact 214 to cause the relay to operate in the other direction. Therefore, since the output at terminal 204 is proportional in amplitude to the departure from positional correspondence of antenna 10 from handwheel 28, it is clear that with the proper polarity and phase connections, the desired sequential reversals of connections to contacts 102 and 104 is secured. The operation with this variation is now clear from what was previously described for the SS position of selector switch 34. Operation in the M position of the selector switch 34 is unchanged. Operation for switch 34 in the C position for continuous scan can also be secured if desired by having section 34b apply a fixed voltage of desired amplitude as a speed control voltage, as shown.

In summary, with the selector switch 34 closed in M position, the servo-system for positioning the antenna 10 is operated as a position servo. The servo amplifier then receives as an error signal a positional control voltage proportional to the lack of positional correspondence between the handwheel 28 and the antenna 10, and with a suitable rate signal introduced to improve the system stability. With the selector switch 34 in SS position, the same servo amplifier receives as error signal the difference between a speed voltage and a reversible polarity speed control voltage, the latter being reversed by a circuit responsive to the position control voltage reaching an arbitrarily selected amplitude, and with a suitable rate of change of speed signal introduced to improve the stability (constancy of speed) of the speed servo system. With the selector switch in the C position operation is the same as in the SS position except that the speed control voltage is unidirectional and fixed in amplitude and the antenna rotates continuously at constant speed.

It is apparent that the invention provides an especially useful type of motor control, having flexibility, and comparative simplicity. The same servo amplifier is employed to serve as position servo amplifier, a reversible sector-scan speed amplifier, or a continuous scan speed amplifier. Scanning in both elevation and azimuth may be secured by duplicating the system shown with an elevation scan motor, except, of course, that scanning in elevation is limited. In this event (a) the antenna 10 may be fixedly positioned in either elevation or azimuth under handwheel control; (b) the antenna 10 may be fixedly positioned at a selected point in one of these coordinates, and scanned about a selected value over a selected sector of the other coordinate; (c) the antenna 10 may be scanned about selected points with selected sector angles, different if desired, in both coordinates; (d) the antenna 10 may be scanned continuously in one coordinate, e. g. azimuth, and scanned over a selected sector angle about a selected angle in the other coordinate. It should be noted that the scanning motions are at substantially constant speeds, excepting of course at the time of reversal of directions. This is often a desirable characteristic, as is understood in the radar art.

What is claimed is:

1. A servo system comprising a servo amplifier having an input circuit and having an output circuit responsive to the sense and amplitude of voltage applied to said input circuit, a motor connected to receive the amplifier output and responsive thereto, an object driven by said motor, a position control element, means to derive a position control voltage having a sense and amplitude corresponding to the lack of positional correspondence between said object and said control element, means to derive a speed voltage having sense and amplitude corresponding to the speed of said object, means supplying a speed control voltage, and switch means selectively applying one of said positional control voltage and the difference between said speed voltage and speed control voltage to said amplifier input circuit whereby the system operates accordingly as one of a positioning servo system and a speed servo system.

2. A servo system comprising a servo amplifier having an input and having an output responsive to the sense and amplitude of voltage applied to said input, a reversible motor connected to receive the amplifier output and responsive thereto, an object driven by said motor, a position control element, means to derive a position control voltage having a sense and amplitude corresponding to the lack of positional correspondence between said object and said control element, means to derive a speed voltage having sense and amplitude corresponding to the speed of said object, means supplying a speed control voltage, and switch means selectively applying to said input said positional control voltage modified by said speed voltage, and a difference voltage between said speed and speed control voltages.

3. The system claimed in claim 2 further comprising means to derive a rate of change of speed voltage, said difference voltage being modified by said rate of change of speed voltage.

4. A servo system comprising a servo amplifier having an input and having an output responsive to the sense and amplitude of voltage applied to said input, a reversible motor connected to receive the amplifier output and responsive thereto, an object driven by said motor, a position control element, means to derive a position control voltage having a sense and amplitude corresponding to the lack of positional correspondence between said object and said control element, means to derive a speed voltage having sense and amplitude corresponding to the speed of said object, a reversing means responsive to a reversal voltage applied thereto to supply a first speed control voltage of one sense when said reversal voltage has one amplitude and a first sense and supplying a second speed control voltage of sense opposite the first when said reversal voltage has another amplitude and a sense opposite that of said first reversal voltage sense, and switch means selectively applying to said amplifier input one of said positional control voltage and the difference between said speed voltage and one of said speed control voltages supplied by said reversing means, said switch means also applying to said reversal means as a reversal voltage said positional control voltage during application to said amplifier of said difference voltage.

5. The system claimed in claim 4, further comprising means to derive a rate of change of speed voltage, and means to modify said speed voltage by said rate of change of speed voltage during application of said difference voltage to said amplifier.

6. The system claimed in claim 1, said means to derive a speed control voltage comprising a tachometer having a direct current voltage output.

7. The system claimed in claim 1, said position control voltage being an alternating current voltage, one sense thereof being in phase and the other sense thereof being out of phase with respect to a reference voltage.

8. The system claimed in claim 4, said switch means comprising a pair of gas tubes each having an anode, cathode, and a control electrode, and connected in circuit with one of said tubes being conductive to draw current exclusively of the other, a relay having a winding and a single pole double throw switch actuated by current flow through said winding, said winding being connected in the anode circuit of one of said tubes, and a source supplying a direct current voltage, said position control voltage being added to said direct current voltage and applied selectively to one of said control electrodes depending on which of said tubes last became conductive.

9. The system claimed in claim 4, said reversing means comprising a second switch means, a polarized relay actuating said second switch means and having a winding, a direct current source in series with said relay winding in a polarity reversed by said second switch means, a reference voltage source, a phase detector having applied at its input as said reversal voltage said positional control voltage, said reference voltage source being connected to said detector, said detector having an output of direct current voltage of one polarity for voltage of one phase at its input and of the opposite polarity for voltage of the opposite phase at its input with reference to said reference voltage, the output amplitude being proportional to the input reversal voltage amplitude.

10. The system claimed in claim 9, said position control voltage means comprising a pair of synchrotransformers, each having a rotor and a stator, one rotor being mechanically connected to said object and the other rotor being connected to said reference voltage source, said stator windings being connected together.

JOHN H. PRATT.

No references cited.